Patented Jan. 5, 1932

1,839,523

UNITED STATES PATENT OFFICE

WILLIAM H. ALLEN, OF DETROIT, MICHIGAN, ASSIGNOR, BY MESNE ASSIGNMENTS, TO PARKER RUST PROOF COMPANY, OF DETROIT, MICHIGAN, A CORPORATION OF MICHIGAN

PROCESS FOR PRODUCING IRON PHOSPHATE

No Drawing.  Application filed April 28, 1928.  Serial No. 273,776.

The present invention relates to a process of recovery for re-utilization of phosphates, particularly those used in the rust-proofing of ferrous metals and to processes of formation of acid phosphates of the other metals of the third group.

In the treatment of ferrous metals for the purpose of surfacing them with a rust-proofing coating of phosphatic material there is always formed in the rust-proofing bath a sediment or sludge of phosphates of iron of complex and somewhat variable composition. This sludge is insoluble in water or the rust-proofing bath and basic in character but contains a large quantity of the more or less expensive phosphatic acid radical. However, owing to the heretofore considered difficulty of treatment of the sludge for recovery of any of its valuable constituents, it has usually been discarded.

The present invention has among its objects the treatment of this sludge to recover the phosphatic constituents and render them available for return to the rust-proofing process or for any other use for which they may be adapted.

Another object is a process which may be adapted for the treatment of similar sludges or waste materials containing other metals of the third group.

The process as applied to the iron containing sludge from the rust-proofing process comprises the treatment of such sludge with phosphoric acid sufficient to furnish enough of the phosphate radical to convert all of the basic phosphatic material to acid iron phosphate which is soluble. The solution thus made is filtered free of dirt, carbon, and other material not attached, leaving a clear solution containing the acid phosphates of both ferric and ferrous iron.

The clear solution thus obtained is then converted to ferrous iron acid phosphate by the addition thereto of further phosphoric acid and iron filings, the nascent hydrogen thus produced being the active reducing agent.

The particular proportions found desirable in the treatment of the iron containing sludge, mentioned above, are as follows: With one volume of 70 to 80% ortho phosphoric acid is thoroughly mixed three to five volumes of the sludge. After the action has ceased, the mixture is filtered and there results a clear solution of acid iron phosphate. To this solution is then added a further portion of the acid—up to about 10% of the weight of the originally added acid and from 3 to 5% by weight of iron filings, or borings. When the action thus produced has ceased there results a solution of ferrous iron acid phosphate capable of use in further rust-proofing.

In the treatment of other sludges containing other metals of the third group such as manganese nickel or cobalt, a similar procedure may be followed.

Now having described the invention and the preferred form of embodiment thereof it is to be understood that the said invention is to be limited not to the specific details herein set forth but only by the claim which follows.

I claim:—

The process of treating an insoluble basic sludge obtained in the rust-proofing of iron, and containing iron phosphates which consists in (a) adding concentrated phosphoric acid to change the sludge from an insoluble basic sludge to a soluble acid sludge, (b) filtering the solution to leave a clear solution containing acid phosphates of ferric and ferrous iron and (c) adding phosphoric acid and iron filings to create nascent hydrogen so as to reduce and convert the solution to a ferrous iron acid phosphate solution.

WILLIAM H. ALLEN.